United States Patent
Aiardo

(10) Patent No.: US 6,169,239 B1
(45) Date of Patent: Jan. 2, 2001

(54) METHOD AND SYSTEM FOR VISUALLY CODING A MUSICAL COMPOSITION TO INDICATE MUSICAL CONCEPTS AND THE LEVEL OF DIFFICULTY OF THE MUSICAL CONCEPTS

(76) Inventor: Doreen G. Aiardo, 437 Barton Dr., Orange, CT (US) 06477

( * ) Notice: Under 35 U.S.C. 154(b), the term of this patent shall be extended for 0 days.

(21) Appl. No.: 09/314,197

(22) Filed: May 20, 1999

(51) Int. Cl.$^7$ .................................................. G09B 15/02
(52) U.S. Cl. ........................ 84/483.2; 84/464 A; 84/645; 84/470 R
(58) Field of Search ............................. 84/483.2, 464 R, 84/464 A, 645, 470 R

(56) References Cited

U.S. PATENT DOCUMENTS

| 3,698,277 | * | 10/1972 | Barra | 84/483.2 X |
|---|---|---|---|---|
| 5,408,686 | | 4/1995 | Mankovitz | 455/66 |
| 5,526,284 | | 6/1996 | Mankovitz | 364/514 R |
| 5,540,132 | * | 7/1996 | Hale | 84/470 R |
| 5,544,562 | * | 8/1996 | Jeon | 84/470 R |
| 5,561,849 | | 10/1996 | Mankovitz | 455/45 |
| 5,574,238 | | 11/1996 | Mencher | 84/483.2 |
| 5,689,078 | | 11/1997 | McClard | 84/600 |
| 5,740,345 | | 4/1998 | Danielson | 395/131 |
| 5,775,915 | | 7/1998 | Quinn | 434/156 |

* cited by examiner

Primary Examiner—Jeffrey Donels
(74) Attorney, Agent, or Firm—Raymond A. Nuzzo

(57) ABSTRACT

A method and system for visually coding a musical composition to indicate musical concepts defined by the musical notation and the level of difficulty of the musical concepts. First, a set of musical concepts is defined. Next, a musical composition is provided. The composition has a plurality of measures that comprise musical notation that defines at least one musical concept. The musical concept has a level of difficulty. The measures are evaluated to determine the musical concepts that are define by the musical notation. The musical notation is then visually coded with indicia of a first indicia set to indicate a particular musical concept that is defined by the musical notation. In a preferred embodiment, each musical concept is evaluated to determine the level of difficulty of that concept. The musical notation pertaining to that concept is further visually coded to indicate the level of difficulty of that concept.

19 Claims, 3 Drawing Sheets

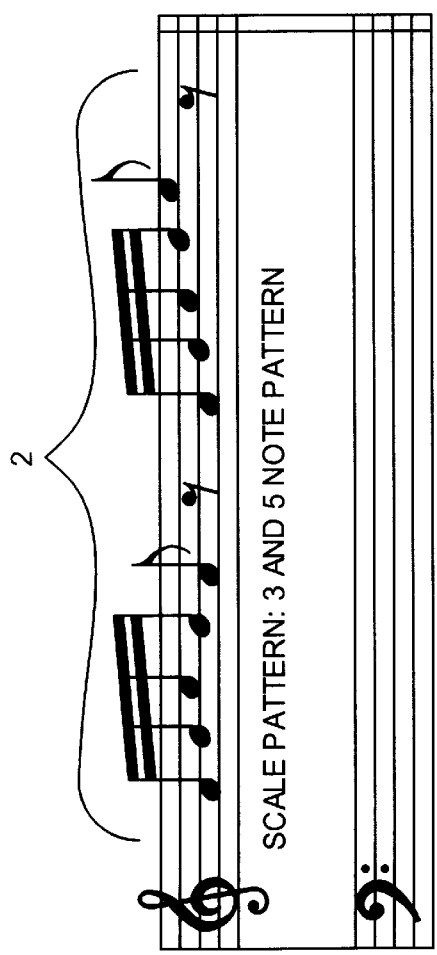
Fig. 4 — SCALE PATTERN: 3 AND 5 NOTE PATTERN
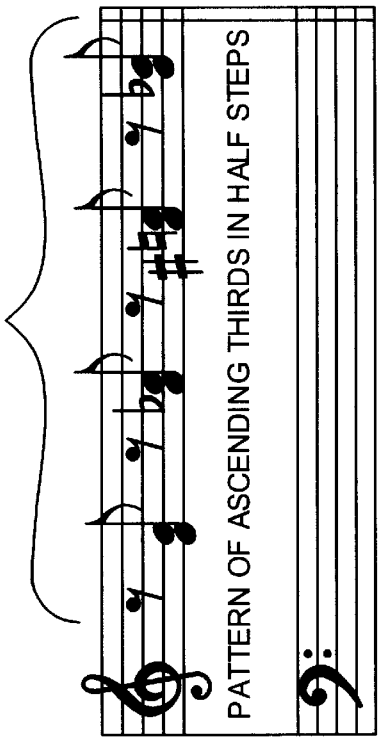
Fig. 5 — PATTERN OF ASCENDING THIRDS IN HALF STEPS
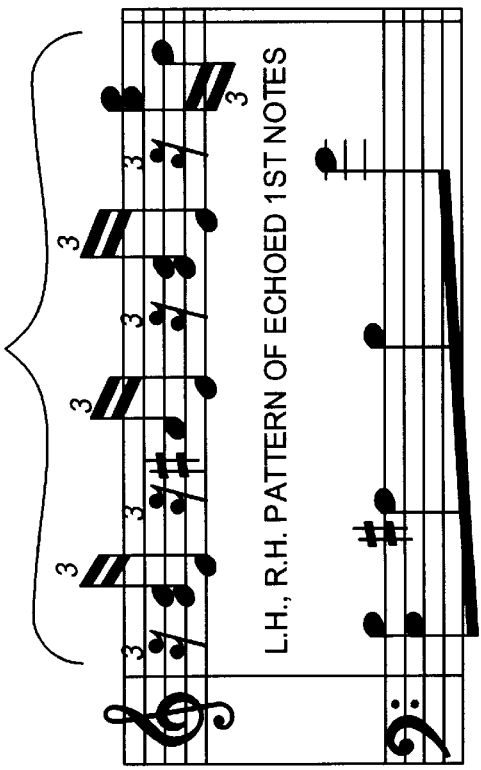
Fig. 6 — L.H., R.H. PATTERN OF ECHOED 1ST NOTES

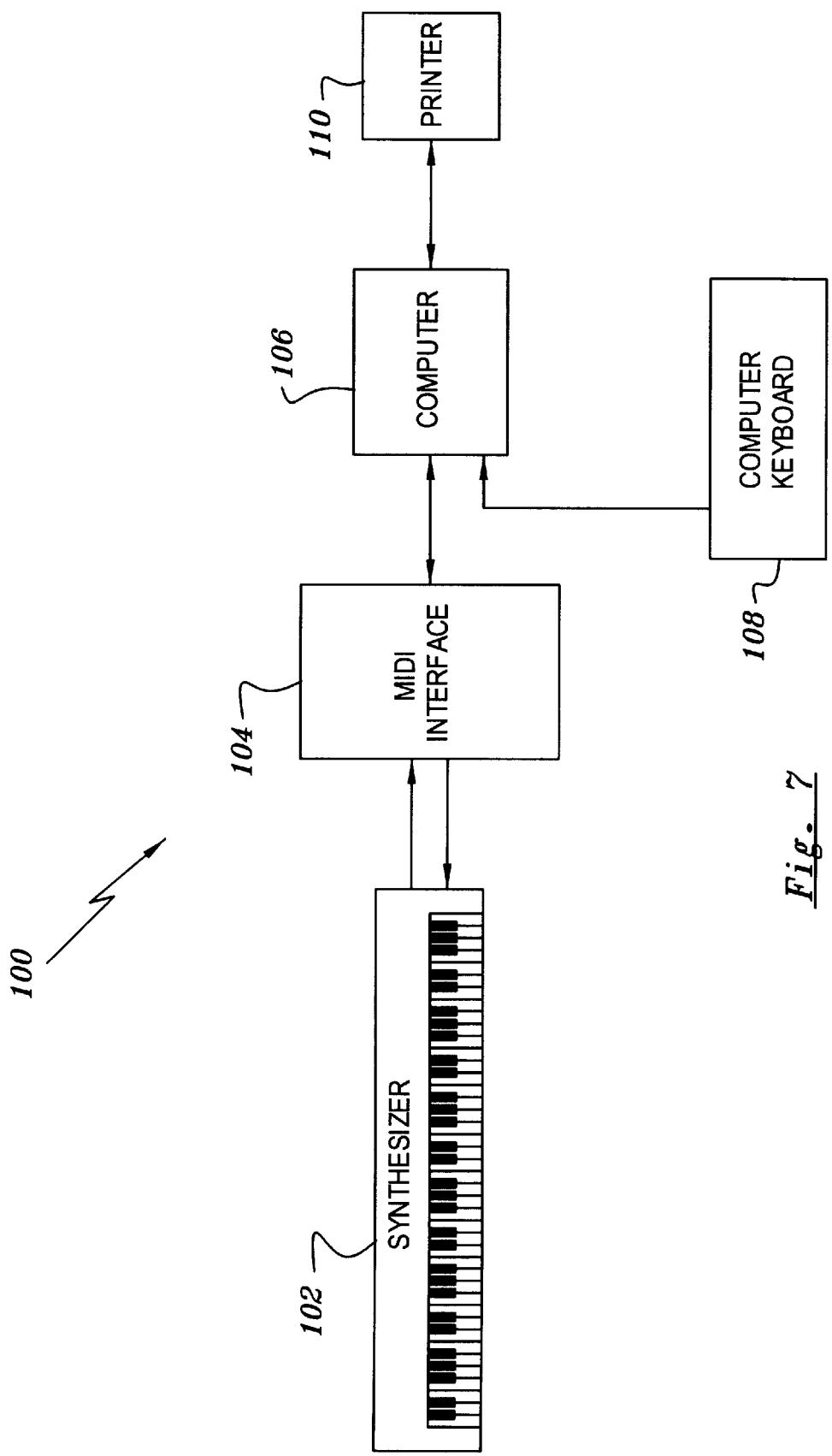

METHOD AND SYSTEM FOR VISUALLY CODING A MUSICAL COMPOSITION TO INDICATE MUSICAL CONCEPTS AND THE LEVEL OF DIFFICULTY OF THE MUSICAL CONCEPTS

BACKGROUND OF THE INVENTION

1. Field of the Invention

The present invention is generally related to a method and system for visually coding a musical composition to indicate particular musical concepts and the level of difficulty of the musical concepts.

2. Problem to be Solved

Providing musical instruction to individuals with no music experience or education can be a very difficult. This difficulty is intensified when the musical instruction is directed to children. There are many factors which contribute to such difficulty. These factors include:

a) an overwhelming number of musical concepts, e.g. arpeggios, chromatic scales, chords, etc., to be learned;

b) difficulty in understanding and recognizing various musical concepts;

c) insufficient time devoted to portions of musical compositions having a relatively higher level of difficulty; and d) poor concentration of the student receiving instruction.

One attempt at solving the aforementioned problems is the disclosed in Quinn U.S. Pat. No. 5,775,915. Quinn discloses indicating accidentals in a musical score by visual coding of the individual notes and associated components as they appear throughout the score. Quinn also discloses indicating changes in the bass or treble clefs by visual coding. However, Quinn does not address the issue of identifying particular musical concepts in a musical score. Specifically, Quinn does not teach the visual coding of musical notation to indicate particular musical concepts defined by such musical notation. Furthermore, Quinn does not teach the visual coding of musical notation to indicate the level of difficulty of the musical concept defined by the musical notation.

Therefore, it is an object of the present invention to provide a novel method of visually coding musical notation of a musical composition to indicate particular musical concepts defined by the musical notation.

It is another object of the present invention to provide a novel method of visually coding musical notation of a musical composition to indicate the level of difficulty of the particular musical concepts defined by the musical notation.

Other objects and advantages of the present invention will be apparent to one of ordinary skill in the art in light of the ensuing description of the present invention.

SUMMARY OF THE INVENTION

The present invention is directed to, in a first aspect, a method for visually coding a musical composition comprising the steps of:

a) defining a set of musical concepts;

b) providing a musical composition having a plurality of measures that comprise musical notation which may define at least one musical concept that has a level of difficulty;

c) evaluating the measures to determine the musical concepts that may be defined by the musical notation of the measures; and d) visually coding the musical notation of each measure with indicia of a first indicia set to indicate a particular musical concept that is defined by the musical notation.

In a related aspect, the present invention is directed to a method for visually coding musical notation of a musical composition to indicate musical concepts defined by the musical notation and the level of difficulty of the musical concepts, comprising the steps of:

a) defining a set of musical concepts;

b) providing a musical composition having a plurality of measures wherein the measures comprise musical notation which may define at least one musical concept that has a level of difficulty;

c) evaluating the measures to determine the musical concepts that are defined by the musical notation of the measures and the level of difficulty of the musical concepts;

d) visually coding the musical notation with a predetermined color that corresponds to a particular musical concept; and e) visually coding the musical notation with a predetermined indicia to indicate the particular level of difficulty of the musical concept defined by the musical notation.

In a further aspect, the present invention is directed to a system for visually coding musical notation of a musical composition to indicate musical concepts defined by the musical notation and the level of difficulty of the musical concepts, comprising:

an electronic keyboard having an output for outputting electrical signals that represent musical notes;

a MIDI interface having an input coupled to the output of the keyboard and an output;

a computer having (i) an input coupled to the output of the MIDI interface, (ii) a display screen, (iii) a keyboard, and (iv) a storage medium for storing a first set of indicia and a second set of indicia wherein each indicia of the first set corresponds to one of a predefined set of musical concepts and each indicia of the second set corresponds to a level of difficulty associated with musical concepts, the storage medium being encoded with machine-readable computer program code to (i) effect display of the musical composition resulting from receiving the electrical signals from the MIDI interface, (ii) allow a user to visually code the musical notation to indicate the musical concept represented by the musical notation, and (iii) allow the user to visually code the musical notation to indicate the level of difficulty of the musical concept defined by the musical notation.

In yet another aspect, the present invention is directed to a storage medium encoded with machine-readable computer program code for processing digital audio data, comprising:

means for causing a computer to receive digital audio data from a MIDI interface wherein the digital audio data defines a musical composition;

means for causing the computer to display the musical composition;

means for causing the computer to store a first set of indicia and a second set of indicia wherein each indicia of the first set corresponds to one of a predefined set of musical concepts and each indicia of the second set corresponds to a level of difficulty associated with a musical concept; and means for causing the computer to allow a user to (i) visually code the musical notation to indicate the musical concept represented by the particular musical notation, and (ii) visually code the musical notation to indicate the level of difficulty of the musical concept defined by the musical notation.

BRIEF DESCRIPTION OF THE DRAWINGS

The features of the invention are believed to be novel and the elements characteristic of the invention are set forth with particularity in the appended claims. The invention itself may best be understood by reference to the detailed description which follows taken in conjunction with the accompanying drawings in which:

FIGS. 4–6 illustrate portions of a musical composition that is visually coded in accordance with the present invention to indicate the level of difficulty of that portion of the musical composition.

FIG. 7 is a block diagram of a system for visually coding musical notation of musical composition in accordance with the present invention to indicate particular musical concepts and the level of difficulty of each musical concept.

DESCRIPTION OF THE PREFERRED EMBODIMENTS

Figure 1:
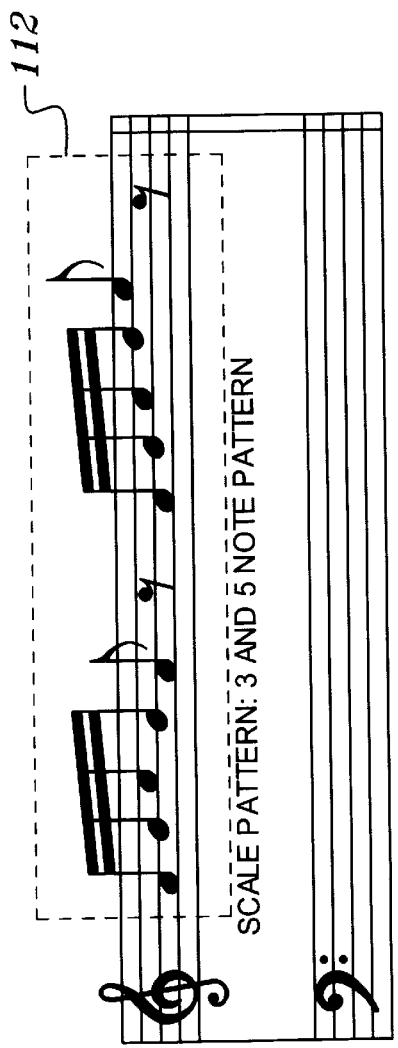
FIGS. 1–3 illustrate portions of a musical composition that are visually coded in accordance with the present invention to indicate a particular musical concept.

In describing the preferred embodiments of the present invention, reference will be made herein to FIGS. 1–7 of the drawings in which like numerals refer to like features of the invention.

1. Definitions

As used herein, the following terms are defined as follows:

a) "Musical notation" is defined to include, but is not limited to, the following notation alone or in combination: (i) individual notes such as whole note, half notes, quarter notes, eighth notes, sixteenth notes, thirty second notes, (ii) notes having dots and double dots, (iii) rests, (iv) chords, (v) tremolo (or shakes and trills), (vi) terminology relating to articulation style such as legato, staccato, a capriccio, addolorato, (vii) terminology relating to dynamics (pertaining to volume of sound) such as piano, mezzo piano, forte, mezzo forte, sforzando, crescendo and decrescendo, (viii) terminology relating to tempo (speed) such as accelerando, ritardando, menuetto, allentando, accelerato, and (ix) terminology that simultaneously indicates tempo and dynamics, such as calando. The foregoing list of musical notation is not exhaustive and there is other notation that is not shown above. For example, in the text entitled "How To Teach Piano Successfully", $2^{nd}$ edition, authored by James W. Bastien (General Words and Music Co./Neil A. Kjof, Jr. publishers, 1997), other musical notation, terminology and definitions are shown on in Appendix G, pages 555–557. The aforementioned pages 555–557 of the aforementioned text are incorporated herein by reference.

b) A "musical concept" is defined as the concept or idea defined by particular musical notation. Examples of "musical concepts" include: individual notes, ascending note patterns, descending note patterns, chords, altered chords, scales, chromatically ascending notes, chromatically descending notes, arpeggios and other patterns, and repeated series of fingering, etc. Each "musical concept" has a corresponding level of difficulty. It is to be understood that this definition of "musical concept" is far from exhaustive and there are many other concepts not listed above but which fall within the scope of this definition. Furthermore, the ensuing description contains a table (Table I) that list specific and detailed musical concepts.

c) "Level of difficulty" is defined as the degree of difficulty that corresponds to a musical concept. The actual level of difficulty of a particular musical concept depends upon the musical notation that defines the musical concept. For example, four individual quarter notes played in staccato fashion would have a lower level of difficulty than a chromatically ascending note pattern. The level of difficulty for a particular musical concept may vary depending upon the instrument (i.e. piano, trumpet, flute, etc.) that will be used to execute the musical composition.

It is to be understood that the present invention can be embodied in the form of computer-implemented processes and apparatuses for practicing those processes. Such an apparatus or system is shown as system 100 in FIG. 7. System 100 generally comprises synthesizer or keyboard 102, MIDI interface 104, computer 106, computer keyboard 108 and printer 110. System 100 is discussed below in detail. The present invention can also be embodied in the form of computer program code embodied on tangible media, such as floppy diskettes, CD-ROMs, hard drives, or any other computer-readable storage medium, wherein when the computer program code is loaded into and executed by a computer (see FIG. 7), the computer and the other apparatuses shown in FIG. 7 cooperate to function as a system for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer and the other apparatuses shown in FIG. 7 become a system for practicing the invention.

2. Method and System of the Present Invention

Referring to FIG. 1, the first step of the method of the present invention comprises defining a set of musical concepts. In one embodiment, the musical instructor formulates a master set of all musical concepts that frequently appear in musical compositions. The formulation of this master set of musical concepts is independent of the instructor's review of the musical composition. Thus, if the music instructor intends to define a master set of musical concepts, the master set can be formulated prior to the review of the musical composition. One set of musical concepts is shown in Table I.

TABLE I

| Musical Concepts |
|---|
| Groups of two and three black keys on keyboard |
| High, low and middle sounds |
| New letters on the keyboard: A B C D E F G |
| Two eighth notes and eighth rest |
| Quarter note and quarter rest |
| Half note and half rest |
| Dotted half note |
| Whole note and whole rest |
| Sharp, flat and natural |
| Letters A B C D E F G on keyboard staff |
| Triads (3 note skips on the staff, e.g. C E G) |
| Triads, block or broken |
| Steps and skips |
| 2/4, 3/4, 4/4 time signs |
| C F G Major 5 finger positions |
| C F G Major key signs |
| C F G Major scales |
| C F G Arpeggios |
| Tonic, subdominant, dominant seventh (I, IV, V7) of each |
| 2nds, 3rds, 4ths, 5ths |
| Staff notes from Mid C up to high D |
| Staff notes from Mid C down to low C |
| G2 note |
| G2 position notes (completing the bass staff) |

TABLE I-continued

Musical Concepts

All triads on white keys of keyboard
Dotted quarter note
Review of keys C, F, G and their New
Relative minors: Am, Dm and Em
Three (3) and five (5) note patterns of these
D A E major 5 finger positions
D A E major key signs
D A E major scales
D A E major chords
D A E Arpeggios
Tonic, subdominant, dominant $7^{th}$ (I, IV, V7) of each
Intervals: $2^{nd}$, $3^{rd}$s, 4ths, 5ths, 6ths, 7ths, octaves
Triplets
Ledger line notes above treble staff
Ledger line notes below treble staff
Ledger line notes below bass staff
6/8 time signature
Three eighth notes
Major and minor $2^{nd}$s, 3rds
Review keys: D A E major
Relative minors: Bm, F#m, C#m
Db, Eb, Ab major 5 finger positions
Db, Eb, Ab major key signs
Db, Eb, Ab major scales
Db, Eb, Ab major chords
Db, Eb, Ab arpeggios
Tonic, subdominant, dominant $7^{th}$ (I, IV, V7 of each)
Pattern of these keys
Four sixteenth notes
Two sixteenth notes
Review keys: Db, Eb, Ab and their New
Relative minors: Bbm, Cm, Fm
B, Bb, Gb, Major 5 finger positions
B, Bb, Gb, Major key signs
B, Bb, Gb, Major scales
B, Bb, Gb, Major chords
B, Bb, Gb, Major arpeggios
Tonic, subdominant, dominant $7^{th}$ (I, IV, V7 of each)
Combinations of eighth and sixteenth notes
Review keys: B, Bb, Gb and their New
Relative minors: G#m, Gm, Ebm
Review of all major and minor keys (1 octave parallel motion)
Chords: diminished, augmented, major $7^{th}$, dominant $7^{th}$
Chords: Major inversions
Chords: Minor inversions
Review all Major and Minor keys (2 octaves parallel motion)
Tempo: Allegro con brio (lively speed)

It is to be understood that the list of musical concepts shown in Table I is not exhaustive and that there are other musical concepts that are not listed above.

The set of musical concepts is stored in the storage medium of computer 106. In an alternate embodiment, the music instructor first examines the musical notation of a selected musical composition and identifies all the pertinent musical concepts in the musical composition. The musical instructor then formulates the set of musical concepts based on his or her review of the musical concepts identified in the musical composition. This step is further described below.

Next, a set of indicia is formulated wherein each indicia corresponds to a particular musical concept. In one embodiment, the set of indicia comprises a set of colors wherein each color corresponds to a particular musical concept. In one embodiment, the colors are individually assigned to each musical concept. The instructor can accomplish this by inputting the selected colors into computer 106 via key board 108. In another embodiment, computer 106 is configured to randomly assign colors to each musical concept. It is to be understood that the use of colors as indicia is just one embodiment and that other types of indicia can be used. Table II below illustrates one subset of musical concepts derived from Table I and a set of colors wherein each color corresponds to a musical concept.

TABLE II

| Musical Concept | Color |
| --- | --- |
| Scale Pattern: 3 & 5 Note Pattern | Blue |
| D Scale Pattern | Green |
| L.H., R.H. Pattern Of Echoed First Notes | Pink |
| Staccato Notes | Red |
| Pattern Of Ascending $3^{rd}$s In Half Steps | Yellow |
| Chords In Root & Inversions | Purple |
| Arpeggio | Brown |
| Major $7^{th}$ Chord | Orange |

Next, a second set of indicia is formulated wherein each indicia corresponds to a level of difficulty that relates to musical concepts. In one embodiment, the second set of indicia comprises a set of numbers. Thus, the number "3" corresponds to a "level 3" musical concept, i.e. the musical concept has a level 3 difficulty. In a preferred embodiment, as the numbers ascend, the corresponding level of difficulty also increases. In one embodiment, each number is used in conjunction with a bracket in order to accurately indicate the musical notation to which the particular level of difficulty applies. This is explained in detail below. The bracket is positioned above the musical notation that defines the musical concept and a number pertaining to the level of difficulty is located adjacent to the bracket. In one embodiment, the numbers are inputted into computer 106 via key board 108. It is to be understood that the use of numbers and brackets as indicia is just one embodiment and that other types of indicia can be used. For example, arrows can be used in place of brackets. In another example, a horizontal line positioned over the musical notation is used in place the brackets. Table III illustrates a set of levels of difficulty and corresponding numeric indicia.

TABLE III

| Concept | Level of Difficulty | Indicia |
| --- | --- | --- |
| Groups of two and three black keys on keyboard | Level Primer | (P) |
| High, low and middle sounds | | |
| New letters on the keyboard: A B C D E F G | | |
| Two eighth notes and eighth rest | | |
| Quarter note and quarter rest | | |
| Half note and half rest | | |
| Dotted half note | | |
| Whole note and whole rest | | |
| Sharp, flat and natural | | |
| Letters A B C D E F G on keyboard staff | | |
| Triads (3 note skips on the staff, e.g. C E G) | | |
| Triads, block or broken | | |
| Steps and skips | | |
| 2/4, 3/4, 4/4 time signs | | |
| C F G Major 5 finger positions | Level 1 | (1) |
| C F G Major key signs | | |
| C F G Major scales | | |
| C F G Arpeggios | | |
| Tonic, subdominant, dominant seventh (I, IV, V7) of each | | |
| $2^{nd}$s, 3rds, 4ths, 5ths | | |
| Staff notes from Mid C up to high D | | |
| Staff notes from Mid C down to low C | | |
| G2 note | Level 1B | (1B) |
| G2 position notes (completing the bass staff) | | |
| All triads on white keys of keyboard | | |

TABLE III-continued

| Concept | Level of Difficulty | Indicia |
|---|---|---|
| Dotted quarter note | Level 2 | (2) |
| Review of keys C, F, G and their New | | |
| Relative minors: Am, Dm and Em | | |
| Three (3) and five (5) note patterns of these | | |
| D A E major 5 finger positions | | |
| D A E major key signs | | |
| D A E major scales | | |
| D A E major chords | | |
| D A E Arpeggios | | |
| Tonic, subdominant, dominant 7th (I, IV, V7) of each | | |
| Intervals: 2nd, 3rds, 4ths, 5ths, 6ths, 7ths, octaves | | |
| Triplets | Level 3 | (3) |
| Ledger line notes above treble staff | | |
| Ledger line notes below treble staff | | |
| Ledger line notes below bass staff | | |
| 6/8 time signature | | |
| Three eighth notes | | |
| Major and minor 2nds, 3rds | | |
| Review keys: D A E major and their New | | |
| Relative minors: Bm, F#m, C#m | | |
| Db, Eb, Ab major 5 finger positions | | |
| Db, Eb, Ab major key signs | | |
| Db, Eb, Ab major scales | | |
| Db, Eb, Ab major chords | | |
| Db, Eb, Ab arpeggios | | |
| Tonic, subdominant, dominant 7th (I, IV, V7 of each) | | |
| Pattern of these keys | | |
| Four sixteenth notes | Level 4 | (4) |
| Two sixteenth notes | | |
| Review keys: Db, Eb, Ab and their New | | |
| Relative minors: Bbm, Cm, Fm | | |
| B, Bb, Gb, Major 5 finger positions | | |
| B, Bb, Gb, Major key signs | | |
| B, Bb, Gb, Major scales | | |
| B, Bb, Gb, Major chords | | |
| B, Bb, Gb, Major arpeggios | | |
| Tonic, subdominant, dominant 7th (I, IV, V7 of each) | | |
| Combinations of eighth and sixteenth notes | Level 5 | (5) |
| Review keys B, Bb, Gb and their New | | |
| Relative minors: G#m, Gm, Ebm | Level 5 | (5) |
| Review of all major and minor keys | | |
| (1 octave parallel motion) | | |
| Chords: diminished, augmented, major 7th, dominant 7th | | |
| Chords: Major inversions | | |
| Chords: Minor inversions | | |
| Review all Major and Minor keys | Level 6 | (6) |
| (2 octaves parallel motion) | | |
| Tempo: Allegro con brio (lively speed) | | |

Referring to FIG. 1, the next step of the method of the present invention is to provide a musical composition having a plurality of measures wherein each measure comprises musical notation. In one embodiment of the present invention, this is accomplished by a user (i.e. the music instructor) playing the musical composition on synthesizer or electronic piano or keyboard 102 (see FIG. 7). Synthesizer 102 outputs electronic signals to MIDI (Musical Instrument Digital Interface) interface 104. MIDI interface 104 receives the signals from synthesizer 102 and transfers these signals to computer 106. In a preferred embodiment, computer 106 includes a display screen and a mouse (not shown). Computer 106 is configured to display the musical composition on the display screen. Thus, the display screen displays the musical staffs and all the musical notation of the musical composition. The musical notation in each measure may define at least one musical concept or a portion of one musical concept. In a preferred embodiment, the musical composition is stored in a storage medium (RAM or random access memory) of computer 106.

In an alternate embodiment, system 100 further includes a scanner (not shown) that is in data communication with computer 106. The user scans the musical composition such that it is electronically transmitted to computer 106. Computer 106 displays the musical composition on the display screen. The musical composition can also be stored in a storage medium of computer 106.

In a further embodiment, system 100 is not used and the musical composition is provided in the form of a hardcopy.

The next step entails evaluating or reviewing musical composition measure to determine pertinent musical concepts that are in the musical composition. In a preferred embodiment, the musical concepts are also evaluated at this time to determine the level of difficulty. In order to accomplish this step, the music instructor reviews the musical notation of each measure of the musical composition.

Figure 2:
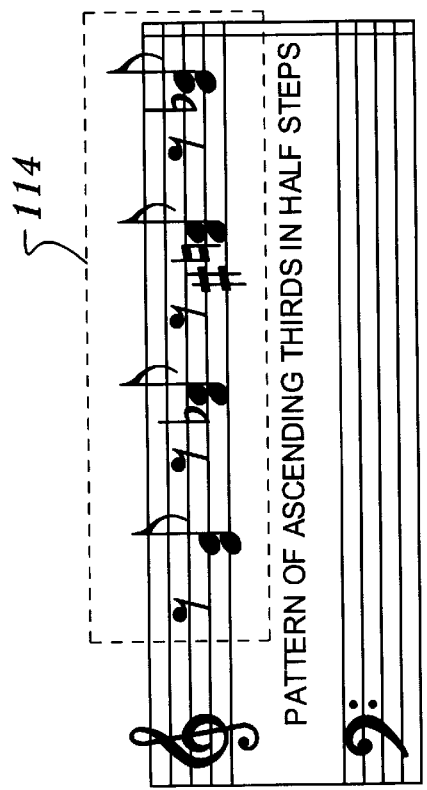
Figure 3:
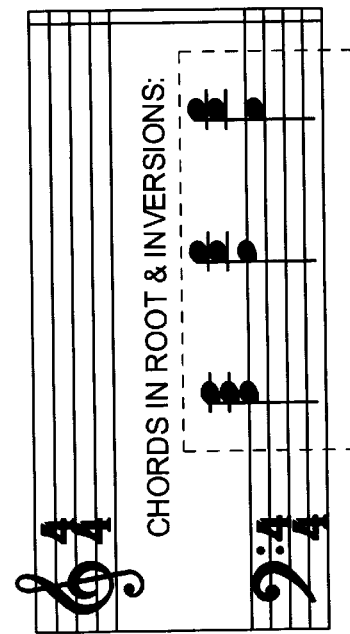

Next, the musical notation of the musical composition is visually coded to indicate the particular musical concept defined by particular musical notation. Thus, the musical notation defining the musical concept is colorized or highlighted with color (coloured or color coded) with the color that was assigned to that particular musical concept in the steps described above. For example, if the musical concept defined by the musical notation in question is a scale pattern having a 3 and 5 note pattern, and the corresponding color is green according to Table II. Thus, all the musical notation defining that musical concept are colorized with the color green. Referring to FIG. 1, there is shown the aforementioned scale pattern. In order to facilitate understanding of the invention and to compensate for the inability to show colors in utility patent applications, the musical notation that is colored green is within dashed (broken lines) reference box 112. Referring to FIG. 2, in another example, the musical notation shown within dashed (broken lines) reference box 114 corresponds to a pattern of ascending 3rds in half steps and is colored yellow in accordance with Table II. Referring to FIG. 3, in another example, the musical notation shown in dashed reference box 116 corresponds to chords in root and inversions and is colored purple in accordance with Table II. It is to be understood that the music instructor may not desire to visually code every concept, but only specific concepts that must be learned by a particular student.

The music instructor preferably uses the mouse to highlight specific musical notation and then colorize the musical notation with the desired color. In such an embodiment, the computer 106 is configured or programmed to display Table II, enable the music instructor to highlight certain musical notation, and then point and click on the particular musical concept in the Table II that is defined by the highlighted musical notation. As a result, the computer's software program effects automatic colorization of the highlighted musical notation with the corresponding color. In another embodiment, these aforementioned steps are implemented with computer keyboard 108.

Next, the musical notation of the pertinent musical concepts are visually coded to indicate the level difficulty of the musical concept. Thus, a number corresponding to the level of difficulty of the musical concept is placed adjacent the musical notation that defines the musical concept. As described above, in one embodiment, a bracket is used to accurately indicate to which musical notation the number applies. Examples of this step are shown in FIGS. 4–6. The musical notation shown in FIG. 4 is identical to the musical notation shown in FIG. 1. As shown in Table III, a scale pattern with 3 and 5 note pattern has a corresponding level of difficulty of "Level 2". Therefore, the number "2" and a bracket are positioned above the musical notation. Furthermore, the musical notation may also be colored green since the musical concept is identical to that in FIG. 1. The musical notation shown in FIG. 5 is identical to the musical notation shown in FIG. 2. As shown in Table III, a pattern of ascending 3rds in half steps has a corresponding level of difficulty of "Level 3". Therefore, the number "3" and a bracket are positioned above the musical notation. Referring to FIG. 6, there is shown musical notation defining a musical concept referred to as "a left hand (L.H.), right hand (R.H.) pattern of $1^{st}$ echo notes". As shown in Table III, this musical concept has a corresponding level of difficulty of "Level 7".

In one embodiment, the music instructor uses the computer mouse to highlight specific musical notation and then attach to the musical notation a number associated with a particular level of difficulty. In such an embodiment, computer 106 is configured or programmed to display a table similar to Table III, enable the music instructor to highlight certain musical notation, and then point and click on the particular level of difficulty in Table III. As a result, the number corresponding to the selected level of difficulty and a bracket appear over the musical notation as shown in FIGS. 4–6. In another embodiment, these aforementioned steps are implemented with computer keyboard 108.

In a preferred embodiment, computer 106 is programmed to allow the music instructor the choice of:

a) visually code musical notation only to indicate musical concepts, or b) visually code musical notation only to indicate level of difficulty, or c) visually code musical notation to indicate both musical concepts and level of difficulty.

It is to be understood that although a musical concept may be the same for all instrumentation, e.g. piano, trumpet, flute, etc., the level of difficulty of that musical concept may be different for different instrumentation. For example, the musical notation shown in FIGS. 4–6 may have levels of difficulty of 2, 3 and 7, respectively, for piano. However, these levels of difficulty may be different for trumpet. Thus, the musical instructor may produce several versions of the same musical composition for different instrumentation wherein the musical concepts in all the versions are all visually coded according to the same color scheme but the corresponding level of difficulty for each musical concept may vary according to the instrument that is used to play the musical composition. In a preferred embodiment, the data storage medium has sufficient space to store a plurality of different visually coded versions of the musical composition wherein each version pertains to a particular instrument.

In an alternate embodiment, computer 106 is programmed to automatically visually code the musical notation to indicate the musical concept upon the user highlighting the particular musical notation with computer keyboard 108 or the mouse and "clicking" on the appropriate icon. In such an embodiment, the storage medium includes a N×3 array that stores a set of patterns of musical notation, the corresponding musical concept defined by the musical notation, and the color corresponding to the musical concept. When the user highlights particular musical notation and "clicks" on the appropriate icon, the highlighted musical notation is compared to every pattern of musical notation in the array. When a match is found, the highlighted musical notation is automatically colored with the color that corresponds to the musical concept that corresponds to the matching musical notation found in the N×3 (N rows, 3 columns) array. A similar configuration can be used to automatically visually code a musical notation defining a particular musical concept to indicate level of difficulty. Specifically, a N×2 array, configured like Table III, is used which includes a plurality of patterns of musical notation, and a plurality levels of difficulty for each of a plurality of musical instruments wherein each pattern of musical notation corresponds to a particular musical concept. In such a configuration, the musical instructor inputs the name of the instrument for which the visually coded musical composition will be used. Upon highlighting the particular musical notation and clicking on an appropriate icon, the musical notation is visually coded with indicia that corresponds to a particular level of difficulty which corresponds to a particular instrument.

In a further embodiment of the present invention, system 100 is not used and the steps of the method of the present invention are implemented manually.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for visually coding a musical composition comprising the steps of:

a) defining a set of musical concepts;

b) providing a musical composition having a plurality of measures that comprise musical notation which may define at least one musical concept that has a level of difficulty;

c) evaluating the measures to determine the musical concepts that are define by the musical notation;

d) evaluating each measure to determine a level of difficulty of the musical concept defined by the musical notation of that measure; and e) visually coding the musical notation with indicia of a first indicia set to indicate a particular musical concept that is defined by the musical notation.

2. The method according to claim 1 wherein in visually coding step (d), the indicia comprises a color.

3. The method according to claim 2 wherein visually coding step (d) comprises colorizing the musical notation with a predetermined color to indicate a particular musical concept.

4. The method according to claim 1 further comprising the step of providing a table comprising of a plurality of musical concepts and a plurality of indicia wherein each indicia corresponds to one of the musical concepts.

5. The method according to claim 4 wherein each indicia comprises a color.

6. The method according to claim 2 further comprising the step of providing a table comprising of a plurality of musical concepts and a plurality of colors wherein each color corresponds to one of the musical concepts.

7. The method according to claim 1 further comprising the step of visually coding the musical notation of each measure with predetermined indicia of a second indicia set that corresponds to a particular level of difficulty of the musical concept defined by the musical notation.

8. The method according to claim 7 further comprising the step of forming a table comprising a plurality of levels of difficulty relating to musical concepts, and a plurality of indicia of the second indicia set wherein each indicia of the second indicia set corresponds to a particular level of difficulty.

9. The method according to claim 7 wherein each indicia of the second indicia set is a number.

10. The method according to claim 1 wherein providing step (b) comprises the steps of:
providing a system comprising:
an electronic keyboard having an output for outputting electrical signals that represent musical notes,
a MIDI interface having an input coupled to the output of the keyboard and an output,
a computer having (i) an input coupled to the output of the MIDI interface, (ii) a display screen, (iii) a data storage medium, and (iv) a keyboard, the computer being configured to display musical compositions that are played on the electronic keyboard; and
playing the musical composition on the keyboard so as to effect display of the musical composition on the display screen.

11. The method according to claim 10 further comprising the steps of:
providing a first table comprised of a plurality of musical concepts and a plurality of colors wherein each color corresponds to one of the musical concepts; and
storing the first table in the data storage medium.

12. The method according to claim 11 further comprising the steps of:
providing a second table comprised of a plurality of levels of difficulty relating to musical concepts, and a plurality of indicia wherein each indicia corresponds to a particular level of difficulty; and
storing the second table in the data storage medium.

13. The method according to claim 12 further comprising the steps of:
operating the computer to display the first and second tables on a portion of the display screen while simultaneously displaying at least a portion of the musical composition;
highlighting particular musical notation of the musical composition;
pointing to and clicking on a musical concept shown in the first table that is defined by the highlighted musical notation so that the musical notation is visually coded with the corresponding color in the first table; and
pointing to and clicking on a level of difficulty in the second table so that the highlighted musical notation is visually coded with the corresponding indicia in the second table.

14. A method for visually coding musical notation of a musical composition to indicate musical concepts defined by the musical notation and the level of difficulty of the musical concepts, comprising the steps of:
a) defining a set of musical concepts;
b) providing a musical composition having a plurality of measures wherein each measure comprises musical notation, the musical notation defining at least one musical concept that has a level of difficulty;
c) evaluating each measure to determine the musical concepts that are define by the musical notation of that measure and the level of difficulty of the musical concepts;
d) visually coding the musical notation of each measure with a predetermined color that corresponds to a particular musical concept; and
e) visually coding the musical notation with a predetermined indicia to indicate the particular level of difficulty of the musical concept defined by the musical notation.

15. A system for visually coding musical notation of a musical composition to indicate musical concepts defined by the musical notation and the level of difficulty of the musical concepts, comprising:
an electronic keyboard having an output for outputting electrical signals that represent musical notes;
a MIDI interface having an input coupled to the output of the keyboard and an output;
a computer having (i) an input coupled to the output of the MIDI interface, (ii) a display screen, (iii) a keyboard, and (iv) a storage medium for storing a first set of indicia and a second set of indicia wherein each indicia of the first set corresponds to one of a predefined set of musical concepts and each indicia of the second set corresponds to a level of difficulty associated with musical concepts, the storage medium being encoded with machine-readable computer program code to (i) effect display of the musical composition resulting from receiving the electrical signals from the MIDI interface, (ii) allow a user to visually code the musical notation of at least one measure to indicate the musical concept represented by the musical notation, and (iii) allow the user to visually code the musical notation of at least one measure of the musical composition to indicate the level of difficulty of the musical concept defined by the musical notation.

16. The system according to claim 15 wherein the storage medium further stores (i) a plurality of predefined musical concepts, (ii) a first set of indicia wherein each indicia of the first set corresponds to one of the musical concepts, (iii) a plurality of predetermined levels of difficulty, and (iv) a second set of indicia wherein each indicia of the second set corresponds to one of the predetermined levels of difficulty.

17. The system according to claim 15 further comprising a printing device for producing a hard copy of the musical composition visually coded with the indicia of the first set and the second set.

18. The system according to claim 15 wherein the computer further comprises a scanner in data communication with the computer to allow a user to scan a musical composition into the computer.

19. A storage medium encoded with machine-readable computer program code for processing digital audio data, comprising:
means for causing a computer to receive digital audio data from a MIDI interface wherein the digital audio data defines a musical composition;
means for causing the computer to display the musical composition;
means for causing the computer to store a first set of indicia and a second set of indicia wherein each indicia of the first set corresponds to one of a predefined set of musical concepts and each indicia of the second set corresponds to a level of difficulty associated with a musical concept; and
means for causing the computer to allow a user to (i) visually code the musical notation of at least one measure to indicate the musical concept represented by the particular musical notation, and (ii) visually code the musical notation of at least one measure of the musical composition to indicate the level of difficulty of the musical concept defined by the musical notation.

* * * * *